United States Patent [19]

Lefevre et al.

[11] Patent Number: 4,969,017

[45] Date of Patent: Nov. 6, 1990

[54] MEASURING DEVICE FOR THE MEASUREMENT, IN A WIDE RANGE, OF A NON-RECIPROCAL PHASE SHIFT GENERATED IN A RING INTERFEROMETER, AND MEASURING METHOD

[75] Inventors: Hervé Lefevre, Paris; Marc Turpin, Bure sur Yvette, both of France

[73] Assignee: Thomson-CSF, Puteaux, France

[21] Appl. No.: 359,600

[22] Filed: Jun. 1, 1989

[30] Foreign Application Priority Data

Jun. 10, 1988 [FR] France .................. 88 07765

[51] Int. Cl.[5] .............................................. G01B 9/02
[52] U.S. Cl. ................................................... 356/350
[58] Field of Search ........................................ 356/350

[56] References Cited

U.S. PATENT DOCUMENTS 4,834,538 5/1989 Heeks et al. .................. 356/350

Primary Examiner—Vincent P. McGraw

Assistant Examiner—S. A. Turner
Attorney, Agent, or Firm—Pollock, VandeSande & Priddy

[57] ABSTRACT

The disclosure pertains to a device for the measurement, in a wide range, of a non-reciprocal phase shift generated in a ring interferometer, to a measuring method and, chiefly, to an optic fiber gyrometer. It also concerns a method of measurement, notably a method for the measurement of rotation speed. The disclosure concerns an improvement in a measuring device comprising a phase modulation device enabling the phase to be automatically locked to an interference fringe of the device. The improvement lies mainly in the fact that the light source emits, in the ring, several light frequencies so as to make it possible to remove uncertainty on the order (0, $\pi$, $2\pi$, etc.) of the interference fringe on which the automatic control is achieved. The disclosure can be applied notably to the making of devices for the measurement of angular speeds. The disclosure can be aplied chiefly to the making of optic fiber gyrometers.

6 Claims, 4 Drawing Sheets

MEASURING DEVICE FOR THE MEASUREMENT, IN A WIDE RANGE, OF A NON-RECIPROCAL PHASE SHIFT GENERATED IN A RING INTERFEROMETER, AND MEASURING METHOD

BACKGROUND OF THE INVENTION

1. Field of the Invention

The invention pertains to a device for the measurement, in a wide range, of a non-reciprocal phase shift generated in a ring interferometer, and its measuring method.

More particularly, it pertains to an optic fiber gyrometer and a method for the measurement of rotational speed.

2. Description of the Prior Art

An essential improvement in optic fiber gyrometers has been described in the French Pat. No. 84 09311. This patent describes an optic fiber gyrometer with a phase shifting device. The phase shift control is obtained by a feedback loop or, preferably, by a dual feedback loop, the second loop performing corrections of the quantification by the first loop. The device described in the French Pat. No. FR-84 09311 can be used to work on the maximum energy of an interference fringe and, thus, to have improved sensitivity and signal-to-noise ratio. However, the phase shift introduced cannot increase indefinitely. Thus, the phase shift has a periodic variation.

The device described in the French Pat. No. FR-84 09311 works perfectly for a limited range of angular speed. The feedback loops enable compensation for low rotation speeds. Excessive rotation speeds could cause the automatic control or feedback device to be locked no longer into the 0 order interference fringe but into a following interference fringe. The device continues to "work" perfectly except that the phase shift between the interference fringe on which the automatic control really takes place and the central (0 order) interference fringe is not taken into account. It follows that, outside the range of operation of the gyrometer, the measurements are false. Furthermore, this locking-in could become stable, causing the measurements to be false for a long period.

The device according to the present invention can be used to obtain the measurement precision of the device described in the patent FR-84 09311 while, at the same time, very greatly extending the range of measurable values. To do so, a device according to the present invention has means by which that interference fringe on which the operation is being done, namely the current interference fringe, can be determined. In this case, locking into a different fringe no longer has the drawbacks inasmuch as, in the determining of the speed, the additional phase shift, introduced by the fact that the central fringe is not worked on, is taken into account. The measurements of the order of the interference fringe, to which the feedback loops are locked, are done, for example, by continuously or periodically comparing the measurements for the different frequencies. For different frequencies, only the zero of the central fringe is stable. The variation in the modulation of the zero with the frequency makes it possible to ascertain the current interference fringe and, consequently, to achieve the compensation needed to determine the precise rotation speed.

SUMMARY OF THE INVENTION

The invention, propose a device for measuring a non-reciprocal phase shift generated in a ring interferometer comprising optical phase shift means and means for the automatic control of an interference fringe on which the phase shift measurements are performed. These means make it possible to identify the current interference fringe, enabling corrections to be made in measurements to take into account a possible phase shift with respect to the order 0 interference fringe.

BRIEF DESCRIPTION OF THE DRAWINGS

The invention will be better understood by means of the following description, and the appended figures, given as non-restrictive examples, of which:

In FIGS. 1 to 5, the same references are used to designate the same elements.

DETAILED DESCRIPTION OF THE INVENTION

Figure 1:
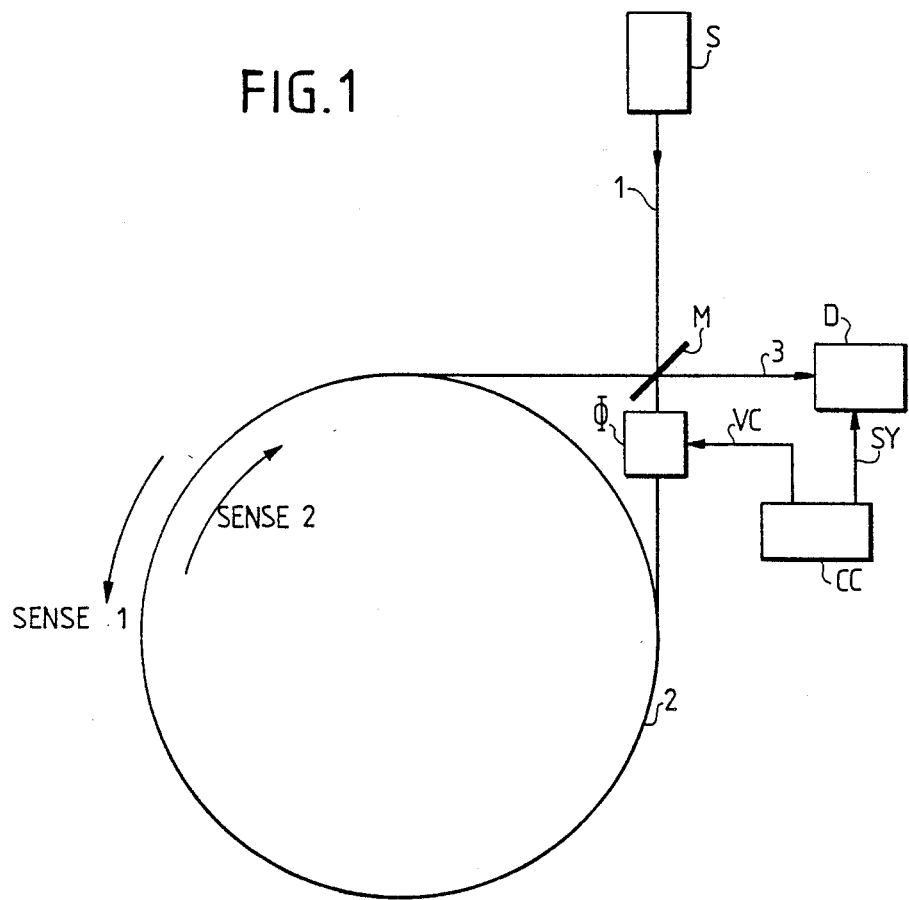
FIG. 1 is a diagram of an optic fiber interferometer described in the patent FR-84 09311.

FIG. 1 shows a prior art type of optic fiber gyrometer, as described in the patent FR-84 09311. The device has a source S of coherent light 1. The coherent light 1 is split into two by a separation device M. The light gets propagated in a first direction, and in a second direction in a ring 2 formed by an optic fiber coil. The light flows, at the input cf the coil, in a direction 2 and, at the output of the coil, in the direction 1, into a phase shifting device $\Phi$. At the output, the separating device M sends the light 3, which has passed through the ring 2 in the direction 1 and the direction 2, towards the detection device D. The detection device D receives a synchronization signal SY from a control circuit CC. The phase shifting device receives a phase shift control signal VC from the control circuit CC.

Figure 2:
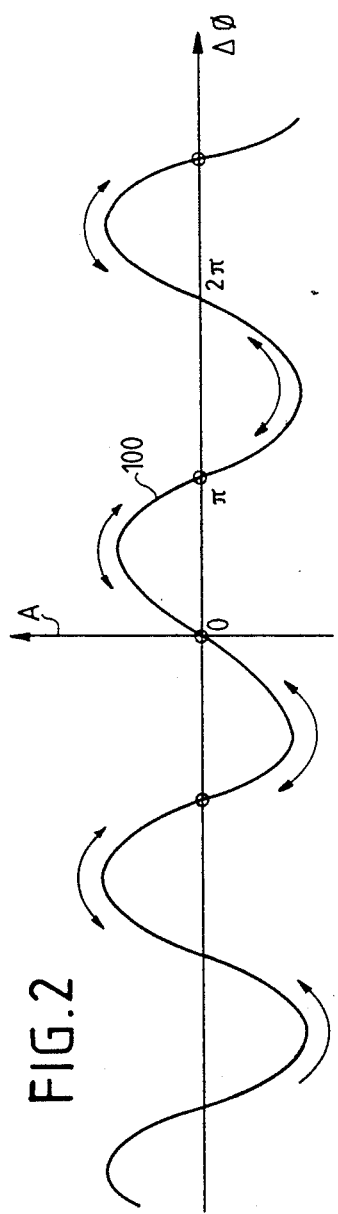
FIG. 2 shows a curve illustrating the drawbacks of prior art devices.

FIG. 2 shows a curve 100 representing the amplitude A of the signal 3 at the output of the ring 2 of FIG. 1, as a function of the phase shift $\Delta\phi$. The system of FIG. 1 makes it possible, first to work on the substantially linear parts of the sinusoid, and second, to bring the interference to an optimum value of detected power. In normal operation, the automatic control therefore brings the phase shifts to the point 0 of the intersection of the axes $\Delta\Phi$ and A. This corresponds to the fact of operating on the order 0 interference fringe. However, if a threshold, notably $\pi$ or $-\pi$, is exceeded at the level of the phase shift, the automatic control could bring the signal no longer to a null phase shift but to another intersection of the curve 100 with the axis $\Delta\Phi$ such as, for example, $\pi$, $2\pi$, $3\pi$ or, if the rotation speed is opposite, $-\pi$, $-2\pi$, $-3\pi$. This corresponds to passage through one or more interference fringes. The directions of the corrections given by the feedback loops are represented by arrows.

The first problem arises out of the fact that it is perfectly possible that the direction of the corrections will not be perceived and that, if it is perceived, it will not be possible to know the fringe on which the measurement is being done. Thus, the result of the value of the phase shift $\Delta\Phi$ may be erroneously detected.

The device according to the present invention enables the achieving of an automatic control on interference fringes which are different from the order 0 fringe making it possible to identify each of these interference fringes.

Figure 3:
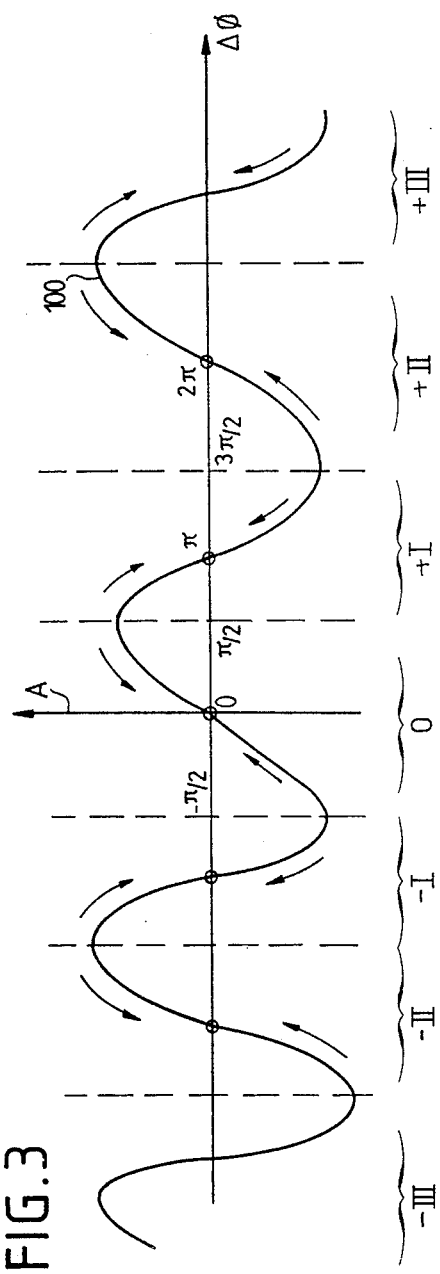
FIG. 3 shows a curve illustrating the principle of the device according to the present invention.

In FIG. 3, the various interference fringes correspond to different regions of the phase shift. The region marked 0 corresponds to the operation around the phase shift 0, i.e. around the central interference fringe. The order 1 fringes corresponding to a phase shift $\Delta\Phi$ equal to $-\pi$ or $+\pi$ are respectively numbered $-I$ and $+I$. The order 2 interference fringes, corresponding to the phase shift of $-2\pi$ and $+2\pi$, are referenced $-II$ and $+II$ and so on in FIG. 3.

Figure 4:
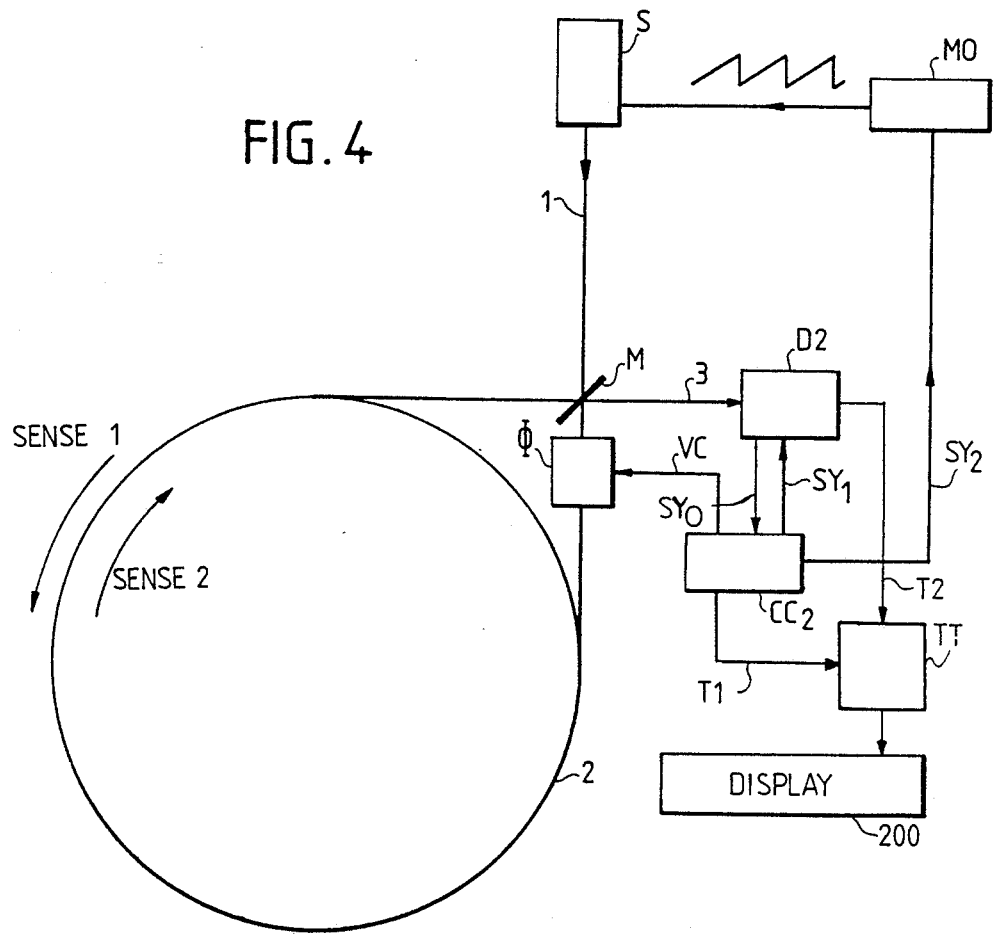
FIG. 4 is a diagram of an embodiment of an optic fiber gyrometer according to the present invention.

FIG. 4 shows an embodiment of the device according to the present invention, making it possible to determine the current interference fringe, so that the rotation speed can be deduced therefrom. In the embodiment of FIG. 4, a frequency modulation is done on the coherent light source S.

The purpose of this modulation is to obtain at least two frequencies and thus operate on at least two wavelengths.

Figure 5:
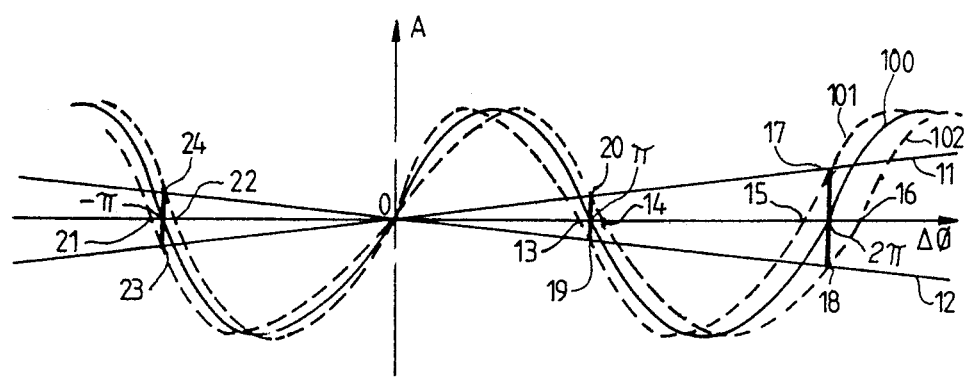
FIG. 5 explains the principles of measurements made on a device according to the present invention.

According to an embodiment illustrated by the graph of FIG. 5, there is provision for operating on these frequencies. The operation is thus done, for example, on a central wavelength and on two wavelengths derived from this central wavelength.

The central wavelength enables the gyrometer to work as described in the already mentioned patent application and notably enables making the dual feedback loops function in order to bring the operating point of the interferometer to an intersection of the central curve 100 with the axis $\Delta\Phi$ namely, one of the points $-\pi$ 0,$2\pi$, etc.

Only the central zero is independent of the wavelength. The shift in the interference fringes of the different waves increases with distance from the zero order. At the points ($-\pi$, $-\pi$, $2\pi$, etc.) other than the central zero, the zero will be modulated at the modulation frequency of the source with an amplitude which increases with distance from the central zero. This modulation depth is shown in FIG. 5 by the segment 19–20 at the point $\pi$ and the segment 17–18 at the point $2\pi$, and it is seen that this modulation depth increases with distance from the central zero.

The measurement of this modulation depth makes it possible to determine which of the operating points $-\pi$, 0, $\pi$, $2\pi$, etc. is the current operating point. The method of the invention thus makes it possible to extend the operating range of measurement of the gyrometer described in the patent referred to.

As a rule, the method of the invention operates with a frequency modulated source S. The operation is done with a continuum of wavelengths ranging between two extreme wavelengths and a central wavelength, which provides a return to the previous operation.

In the above, and notably, in the description relating to FIG. 5, an operation with three frequencies of the source S has been considered. The method of the invention and the system that results therefrom also works with the use of two frequencies. In this case, one of the two wavelengths, for example the one giving rise to the curve 101 of FIG. 5, will be used to set the dual feedback in the way already known from the patent application referred to above. The detection of the point of operation ($-\pi$, 0, $-\pi$, $2\pi$, etc. is then done in the same way as above, on both wavelengths.

To implement the method of the invention, according to a preferred embodiment of the system of the invention, the source S is a semiconductor laser. It is thus possible to obtain a frequency modulation in performing, through a device MO, a current modulation of the semiconducting laser. The current modulation causes, in a certain range of frequency, a frequency modulation of the light 1 emitted by the source S.

In a first case, the modulation is continuous, for example in asymmetrical saw-toothed form as shown in FIG. 4; in symmetrical saw-toothed form; or in sinusoidal form. The modulation frequency comes from a synchronization signal $SY_2$ generated by the control circuit CC2. The frequency of the synchronization signal $SY_2$ is, for example, a sub-multiple of the frequency of the phase modulator modulation control signal VC generated by the control circuit CC2. The signal VC is defined by the circuit CC2 by means of a detection signal $SY_0$ given by the synchronous detection device D2. The circuit CC2 further generates a synchronization signal $SY_1$ needed for the working of the synchronous detection device D2, which receives the signal 3 from the ring 2.

The system of the invention further comprises a processing device that receives, first, through a link T1, a phase shift signal derived from the two automatic controls applied to the control circuit CC2 and, second, through a link T2, the value of the depth of modulation (interference fringes due to the waves transmitted by the source S) after automatic control by the circuit CC2 and the obtaining of an operation at one of the order $-\pi$, 0, $\pi$, $2\pi$, etc. points.

The circuit TT, on the basis of the amplitude of the signal received on the link T2, determines the point of operation of the system. Accordingly, it then corrects the phase shift signal received on the link T1.

The result of the measurement is displayed on a display device 200.

In a second embodiment, the modulation of the source S is not permanent. The source S works at a fixed frequency except at instants that are, for example periodically distributed in time, where it is necessary to determine the interference fringe on which the operation is being done. Once the interference fringe has been determined, it is possible to work on a single frequency for a time interval during which it is thought that there will be no change in the interference fringe.

To complete the description of the system of the invention, FIG. 5 shows the influence of the variation in optical frequency and, hence, of the wavelength on the phase shift induced in the ring 2 of FIG. 1. FIG. 5 shows, in addition to the curve 100, corresponding to a wavelength $\lambda$, a curve 101 corresponding to a wavelength $\lambda$-$\Delta\lambda$ and a curve 102 corresponding to $\lambda$+$\Delta\lambda$.

For a null phase shift, the three curves 100, 101 and 102 pass through the point 0 which is the intersection of the axis $\Delta\Phi$ and the axis A.

On the contrary, for a phase shift equal to $\pi$ or to $-\pi$ of the curve 100 of wavelengths, the other curves 101 and 102 will have non-null amplitudes A. At the point $\pi$, the curve 102 shows a positive amplitude marked 20. At the point corresponding to the phase shift $-\pi$ for the curve 100, the curve 102 shows a positive amplitude marked 24. At the point corresponding to the phase shift $\pi$ for the curve 100, the curve 101 shows a negative amplitude A marked 19. At the point corresponding to the phase shift $-\pi$ of the curve 100, the curve 101 shows a negative amplitude marked 23.

At the point corresponding to the phase shift equal to $2\pi$ for the curve 100, the curve 101 shows a positive amplitude marked 17.

At the point for which the phase shift corresponds, for the curve 100, to $2\pi$, the curve 102 shows a negative amplitude marked 18.

As can be seen in the example of FIG. 5, the points 20 and 19, 17 and 18 are placed symmetrically with respect to the axis. The amplitudes therefore increase with distance from the point 0 on the axis.

The interference fringe on which the operation is being done will be determined by measuring the differences in amplitude for the curves 101 and 102, namely by measuring of the modulation of the mean zero.

It can be seen that the difference in phase shift value for the curves 101 and 102 varies with the interference fringe on which the operation is being done. The amplitude of modulation of the automatic control zero is all the greater as the order of the fringe is high.

It is clear that the detection and sampling must necessarily be done in synchronism with the modulation.

What is claimed is:

1. A system for measuring non-reciprocal phase shift generated in a ring interferometer comprising:
    a source of coherent light;
    means located in optical alignment with the ring interferometer for shifting the phase of light emitted therefrom;
    modulation means connected to the source for causing simultaneous emission therefrom of at least two light signals at different frequencies, one of which is a central frequency;
    means for measuring the difference in amplitude of the signals which determines the depth of modulation and thus the corresponding order of an interference fringe at which the phase-shifting means operates; and
    means for compensating the phase-shifted light emitted by the ring interferometer by a value dependent upon the order of the interference fringe.

2. The structure set forth in claim 1 wherein the modulation means causes simultaneous emission from the source of three light signals at different frequencies, one of which is a central frequency.

3. The structure set forth in claim 2 wherein the measuring means measures amplitude difference between two signals other than the signal at the central frequency.

4. In a method for the measurement of a non-reciprocal phase shift in a ring interferometer by comparing the phases of light signals traveling in opposite directions through the ring, the method comprising the steps:
    generating a coherent beam of light for travel through the ring in opposite directions;
    shifting the phase of light emitted from the ring;
    modulating the light for causing simultaneous emission therefrom of at least two light signals at different frequencies, one of which is a central frequency;
    measuring the difference in amplitude of the signals which determines the depth of modulation and thus the corresponding order of an interference fringe at which the phase-shift occurs; and
    compensating the phase-shifted light emitted by the ring interferometer by a value dependent upon the order of the interference fringe.

5. The method set forth in claim 4 wherein the modulation step causes simultaneous emission from the source of three light signals at difference frequencies, one of which is a central frequency.

6. The method set forth in claim 4 wherein the measuring step measures the amplitude difference between two signals other than the signal at the central frequency.

* * * * *